United States Patent
Chang

(10) Patent No.: US 10,440,543 B2
(45) Date of Patent: Oct. 8, 2019

(54) BLUE-TOOTH COMMUNICATION SYSTEM AND BROADCASTING METHOD THEREOF

(71) Applicant: Microchip Technology Incorporated, Chandler, AZ (US)

(72) Inventor: Li-Wei Chang, Hsinchu (TW)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 0 days.

(21) Appl. No.: 15/651,527

(22) Filed: Jul. 17, 2017

(65) Prior Publication Data
US 2017/0318413 A1 Nov. 2, 2017

Related U.S. Application Data

(63) Continuation of application No. 14/340,580, filed on Jul. 25, 2014, now Pat. No. 9,712,950.

(30) Foreign Application Priority Data

May 21, 2014 (TW) .............................. 103117797 A

(51) Int. Cl.
*H04W 4/80* (2018.01)
*H04W 72/00* (2009.01)
(Continued)

(52) U.S. Cl.
CPC .............. *H04W 4/80* (2018.02); *H04H 20/38* (2013.01); *H04H 20/61* (2013.01); *H04H 40/09* (2013.01); *H04W 72/005* (2013.01); *H04L 47/28* (2013.01)

(58) Field of Classification Search
CPC ... H04W 4/008; H04W 72/005; H04W 20/38; H04W 20/61; H04W 40/09; H04L 47/28
See application file for complete search history.

(56) References Cited

U.S. PATENT DOCUMENTS 7,613,141 B2 11/2009 Hur et al. ............. 370/312
9,712,950 B2 7/2017 Chang
(Continued)

FOREIGN PATENT DOCUMENTS

CN 102036125 A 4/2011 ........... H04B 1/7156
TW 201108808 A 3/2011 ............ H04W 72/00
(Continued)

OTHER PUBLICATIONS

Haartsen, Jaap C., "The Bluetooth Radio System," IEEE Personal Communications, pp. 28-36, Feb. 2000.
(Continued)

*Primary Examiner* — Zhitong Chen
(74) *Attorney, Agent, or Firm* — Slayden Grubert Beard PLLC

(57) ABSTRACT

A blue-tooth communication system and a broadcasting method therefor are provided. The broadcasting method includes: detecting N blue-tooth receivers in a blue-tooth range of a blue-tooth transmitter; broadcasting a data package during at least one transmitting timing window by the blue-tooth transmitter; and receiving N returned data packages which are respectively returned by the corresponding blue-tooth receivers by the blue-tooth transmitter during N receiving timing windows. At least one of the N returned data packages includes an acknowledge message which is recorded in a header field of the corresponding returned data package.

20 Claims, 4 Drawing Sheets

(51) Int. Cl.
*H04H 40/09* (2008.01)
*H04H 20/38* (2008.01)
*H04H 20/61* (2008.01)
*H04L 12/841* (2013.01)

(56) References Cited

U.S. PATENT DOCUMENTS

| | | | |
|---|---|---|---|
| 2004/0082343 A1 | 4/2004 | Kim et al. | 455/456.1 |
| 2004/0148426 A1* | 7/2004 | Hur | H04L 12/1881 |
| | | | 709/236 |
| 2004/0174844 A1* | 9/2004 | Cho | H04L 12/1868 |
| | | | 370/328 |
| 2006/0018319 A1* | 1/2006 | Palin | A63F 13/12 |
| | | | 370/390 |
| 2006/0056421 A1 | 3/2006 | Zaki | 370/400 |
| 2007/0115821 A1* | 5/2007 | Sim | H04L 1/1664 |
| | | | 370/231 |
| 2009/0232041 A1 | 9/2009 | Smith | 370/312 |
| 2013/0011025 A1 | 1/2013 | Liu et al. | 382/118 |
| 2014/0269658 A1* | 9/2014 | Sadasivam | H04W 72/0406 |
| | | | 370/338 |

FOREIGN PATENT DOCUMENTS

| | | | | |
|---|---|---|---|---|
| TW | 201223253 A | 6/2012 | | H04N 21/40 |
| TW | 201304573 A | 1/2013 | | H04L 29/06 |

OTHER PUBLICATIONS

Taiwan Office Action, Application No. 103117797, 4 pages, dated Jan. 12, 2016.
Chinese Office Action, Application No. 201410272528.4, 7 pages, dated Feb. 27, 2017.
Chinese Office Action, Application No. 201410272528.4, 10 pages, dated Jan. 31, 2018.

* cited by examiner

BLUE-TOOTH COMMUNICATION SYSTEM AND BROADCASTING METHOD THEREOF

CROSS-REFERENCE TO RELATED APPLICATION

This application is a continuation of U.S. patent application Ser. No. 14/340,580 filed on Jul. 25, 2014, which claims the priority benefit of Taiwan application serial no. 103117797, filed on May 21, 2014. The entirety of the above-mentioned patent applications are hereby incorporated by reference herein and made a part of this specification.

BACKGROUND

Field of the Invention

The invention relates to a blue-tooth communication system and more particularly, to a blue-tooth communication system and a broadcasting method thereof.

Description of Related Art

Along with the rapid development of science and technology at the present, wireless data communication is more popular among electronic devices. The blue-tooth protocol is a well-known wireless data transmission protocol, and is widely applied in portable electronic devices.

Nowadays, a conventional blue-tooth transceiver can transmit broadcast data packages in one way. As for data package broadcasting, a conventional blue-tooth transmitter cannot get any information from blue-tooth receivers after a data package is broadcasted to the blue-tooth receivers. That is to say, the blue-tooth transmitter is incapable of knowing whether the data package is received by the blue-tooth receivers successfully or not. All the conventional blue-tooth transmitter can do is only to re-broadcast the data package for several times, and the number of the re-broadcasting can only be set based on experiences of an engineer. In the conventional technique, it is difficult to control the quality of the data package broadcasting.

Meanwhile, in a conventional blue-tooth communication system, the blue-tooth transmitter broadcasts the data package only according to a pre-defined broadcasting manner. In case a blue-tooth receiver end suddenly generates a request that is not defined, the broadcasting behaviors of the blue-tooth transmitter end cannot be changed immediately, which causes inconvenience to the usage.

SUMMARY

The invention provides a blue-tooth communication system and a broadcasting method therefor which establish communication channels between blue-tooth receivers and a blue-tooth transmitter, so as to enhance system performance.

The invention provides a broadcasting method for a blue-tooth communication system. The broadcasting method includes: detecting N blue-tooth receivers in a blue-tooth range of a blue-tooth transmitter, where N is a positive integer; broadcasting a data package during at least one transmitting timing window by the blue-tooth transmitter; and receiving N returned data packages which are respectively returned by the corresponding blue-tooth receivers by the blue-tooth transmitter during N receiving timing windows. At least one of the N returned data packages includes an acknowledge message which is recorded in a header field of the corresponding returned data package.

In an embodiment of the invention, the header field includes an address field, a category or type field, a flow field, a reply field, a sequentially numbering field and a header error control field.

In an embodiment of the invention, the acknowledge message is recorded in the address field, the category or type flow field, the flow field and the reply field.

In an embodiment of the invention, the broadcasting method further includes performing adjustment on the broadcasting operation of the data package according to the acknowledge message.

The invention provides a blue-tooth communication system, including detecting a blue-tooth transmitter and N blue-tooth receivers. The blue-tooth transmitter has a blue-tooth range. The N blue-tooth receivers are arranged in the blue-tooth range. The blue-tooth transmitter broadcasts a data package during a transmitting timing window to transmit the data package to the blue-tooth receivers, the blue-tooth receivers respectively return N returned data packages to the blue-tooth transmitter, and at least one of the N returned data packages includes an acknowledge message which is recorded in a header field of the corresponding returned data package, where N is a positive integer.

To sum up, in the invention, the blue-tooth receivers record the acknowledge message in the header field of the at least one of the returned data packages and return the returned data packages to the blue-tooth transmitter to communicate therewith. In this way, the broadcasting operation may be performed among electronic devices through blue-tooth transmission interfaces with two-way communication to effectively improve system performance.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
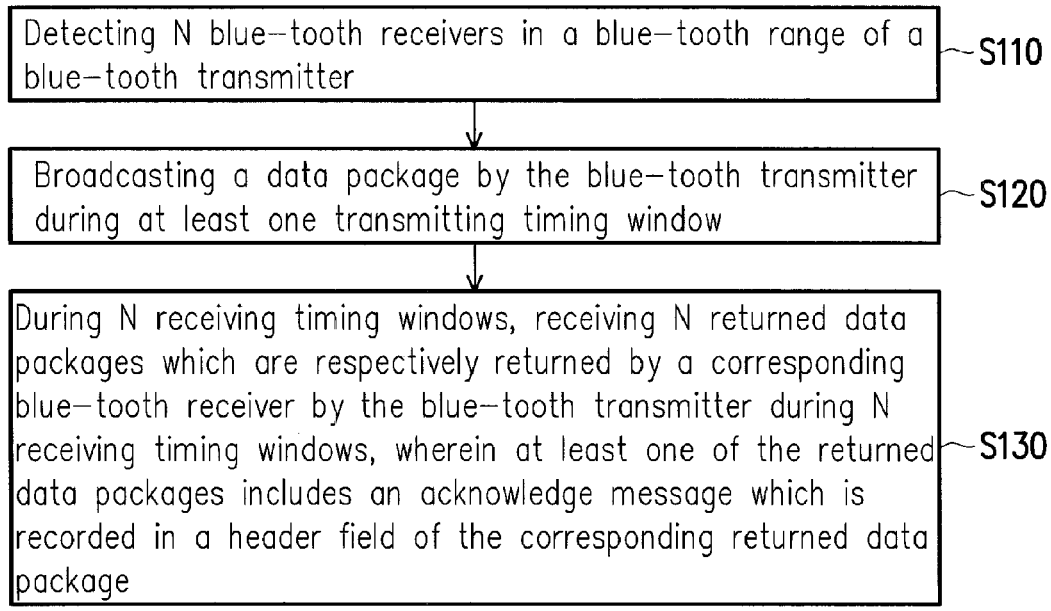
FIG. 1 is a flow chart illustrating a broadcasting method for a blue-tooth communication system according to an embodiment of the present invention.

FIG. 1 is a flow chart illustrating a broadcasting method for a blue-tooth communication system according to an embodiment of the present invention. Referring to FIG. 1, in step S110, one or more blue-tooth receivers in a blue-tooth range of a blue-tooth transmitter are detected, and in this way, a data package is broadcasted to all the blue-tooth receivers in the blue-tooth range. Meanwhile, in step S120, the blue-tooth transmitter broadcasts the data package to the blue-tooth receivers in the blue-tooth range during at least one transmitting timing window. Therein, the at least one transmitting timing window in which the blue-tooth transmitter broadcasts the data package may be one or plural. In a scenario of a plurality of transmitting timing windows, the transmitting timing windows may periodically occur according to a broadcasting cycle of the blue-tooth transmitter.

Then, in step S130, the one or more blue-tooth receivers in the blue-tooth range respectively return one or more returned data packages during corresponding receiving timing windows. At least one of the returned data packages includes an acknowledge message which is recorded in a header field in a blue-tooth format of the corresponding returned data package.

Figure 2A:
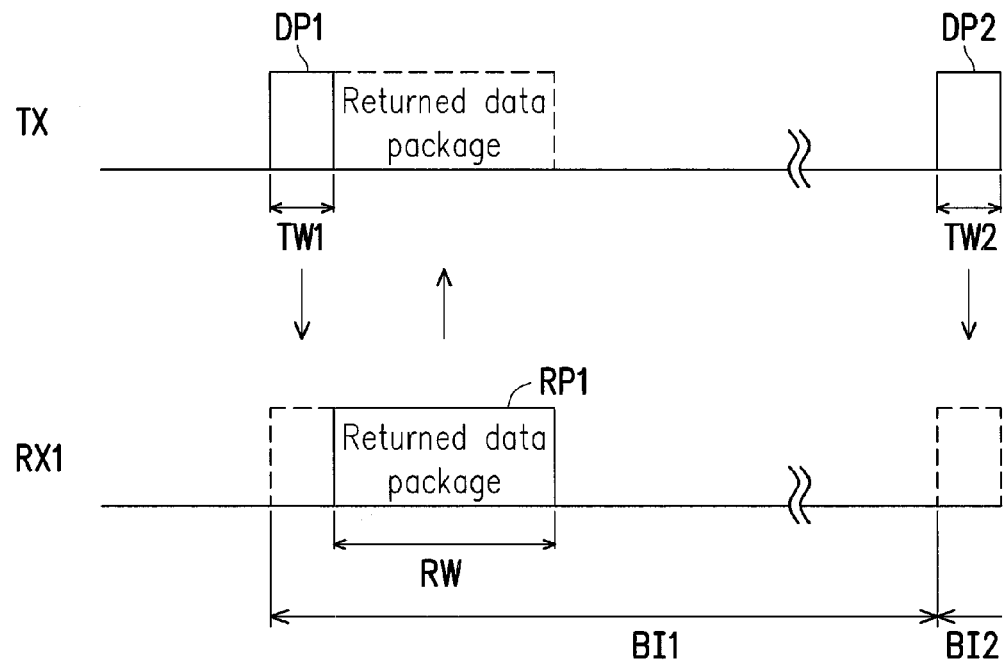
FIG. 2A through FIG. 2C are operation waveform graphs of different embodiments of the invention.
Figure 2B:
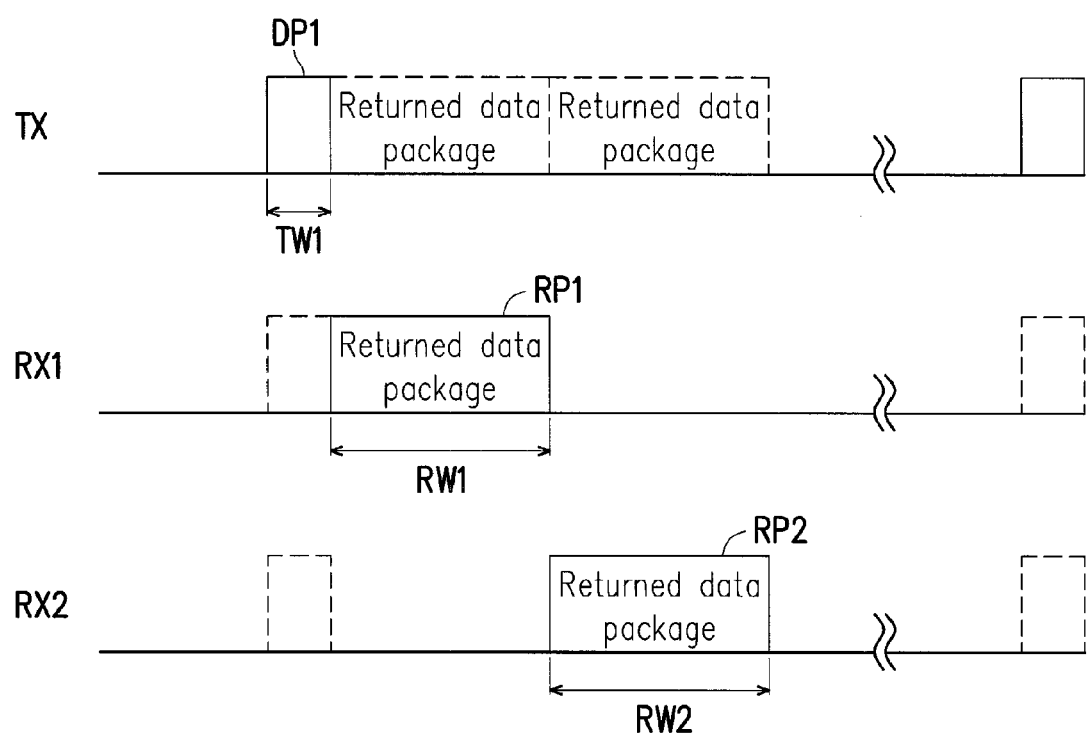
Figure 2C:
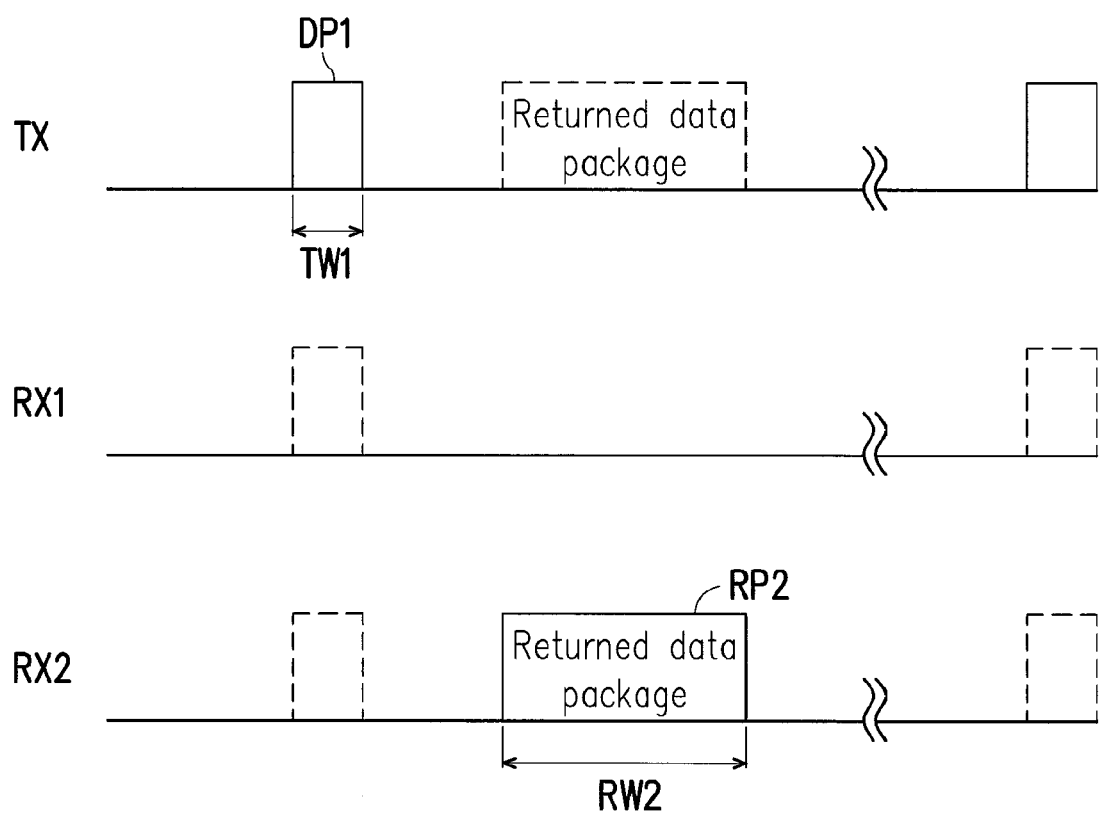

Referring to FIG. 2A through FIG. 2C, FIG. 2A through FIG. 2C are operation waveform graphs of different embodiments of the invention. Referring to FIG. 2A, a blue-tooth transmitter TX sequentially broadcasts data packages DP1 and DP2 during transmitting timing windows TW1 and TW2 respectively corresponding to broadcasting cycles BI1 and BI2. A blue-tooth receiver RX1 correspondingly receives the data package DP1 in a blue-tooth range of the blue-tooth transmitter TX and returns a returned data package RP1 to the blue-tooth transmitter TX during a receiving timing window RW1. The returned data package RP1 includes not only an acknowledge signal but also an acknowledge message. The acknowledge signal serves to inform the blue-tooth transmitter TX that the data package DP1 is received by the blue-tooth receiver RX1, and the acknowledge message may serve to transmit a request of the blue-tooth receiver RX1. It should be noted that the acknowledge message in the returned data package RP1 may be recorded in a header field of the returned data package RP1.

For instance, the blue-tooth transmitter TX may broadcast multimedia data streaming data packages DP1 and DP2 during the broadcasting cycles BI1 and BI2. The blue-tooth receiver RX1 may inform the blue-tooth transmitter TX of one or more requesting messages through an acknowledge message contained in the returned data package RP1 for an operation, such as changing music tracks or stopping playback, such that a system which the blue-tooth transmitter TX belongs to may perform a corresponding operation to meet the request of the blue-tooth receiver RX1.

In addition, the receiving timing window RW may immediately follows the transmitting timing window TW1.

Thus, after receiving the acknowledge message transmitted by the blue-tooth receiver RX1, the system of the blue-tooth transmitter TX may perform adjustment on the data packages and deliver the adjusted data package DP2 during the transmitting timing window TW2 corresponding to the broadcasting cycle BI2 to broadcast the data package DP2.

Referring to FIG. 2B, a plurality of blue-tooth receivers RX1 and RX2 are in the blue-tooth range of the blue-tooth transmitter TX. After the blue-tooth transmitter TX broadcasts the data package DP1 during the transmitting timing window TW1, the blue-tooth receivers RX1 and RX2 may transmit the returned data packages RP1 and RP2 to the blue-tooth transmitter TX respectively during the corresponding receiving timing windows RW1 and RW2.

Certainly, not all of the blue-tooth receivers in the blue-tooth range of the blue-tooth transmitter TX have to transmit the returned data packages to the blue-tooth transmitter TX. Referring to FIG. 2C, corresponding to the broadcasting of the data package DP1 during the transmitting timing window TW1, only the blue-tooth receiver RX2 transmits the returned data packages P2 to the blue-tooth transmitter TX during the corresponding receiving timing window RW2. In other words, whether the returned data packages are transmitted or nor is determined by individual blue-tooth receivers according to their system requirements, which is not specially limited.

Additionally, the blue-tooth receivers that do not transmit the returned data packages may also inform the blue-tooth transmitter TX of receiving states with respect to the data packages through returning acknowledge signals.

Figure 3:
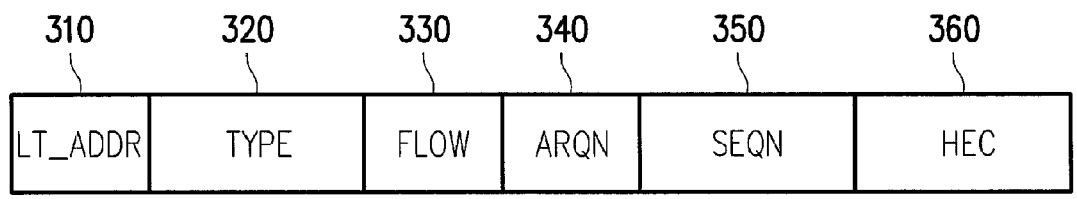
FIG. 3 is a schematic diagram illustrating a header field according to an embodiment of the invention.

Referring to FIG. 3, FIG. 3 is a schematic diagram illustrating a header field according to an embodiment of the invention. A header field 300 includes an address field (LT_ADDR) 310, a category or type field (TYPE) 320, a flow field (FLOW) 330, a reply field (ARQN) 340, a sequentially numbering field (SEQN) 350 and a header error control field (HEC) 360. The address field 310 serves to record an address of a system and may include 3 bits. When a returned data package having "000" in the address field 310, it indicates that the returned data package is a broadcast package. The category or type field 330 has 4 bits and may serve to record a category or a type of a data package. The flow field 330 has 1 bit and may serve to record a flow state of a data package. The reply field 340 has 1 bit and may serve to record returned information to inform a transmitter end that a data package is received. The sequentially numbering field 350 may record whether a data package is repeatedly or sequentially transmitted. The header error control field 360 stores an error detection code.

It should be noted that an acknowledge message may be recorded in one bit or all bits of the address field 310, the category or type flow field 320, the flow field and the reply field, while the sequentially numbering field 350 and the header error control field 360 are reserved for the original purposes. Certainly, which fields or bits are used may be pre-defined between the blue-tooth transmitter and the blue-tooth receivers to avoid communication difficulties.

Figure 4:
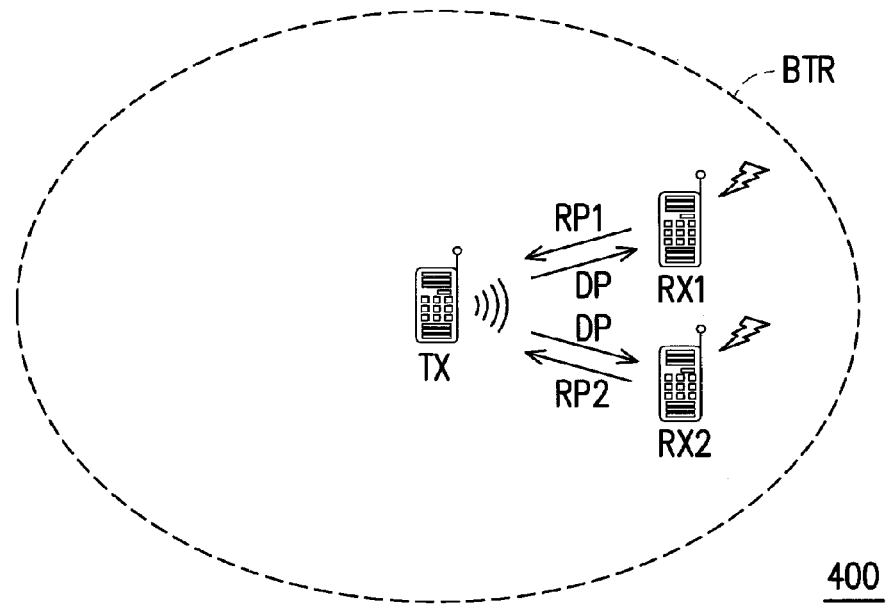
FIG. 4 is a schematic view illustrating a blue-tooth communication system according to another embodiment of the present invention.

Referring to FIG. 4, FIG. 4 is a schematic view showing a computer system according to another embodiment of the present invention. A blue-tooth communication system 400 includes a blue-tooth transmitter TX and a plurality of blue-tooth receivers RX1 and RX2. The blue-tooth transmitter TX and the blue-tooth receivers RX1 and RX2 may be disposed in electronic devices (such as smart phones, mobile phones, notebook computers tablet computers and so on) respectively. The blue-tooth transmitter TX may first search in a blue-tooth range BTR thereof and identify blue-tooth receivers RX1 and RX2 located in the blue-tooth range BTR. The blue-tooth transmitter TX also performs data broadcasting (e.g., broadcasting a music data streaming data package DP) to the blue-tooth receivers RX1 and RX2 in the blue-tooth range BTR. At least one of the blue-tooth receivers RX1 and RX2 may change the broadcasting operation of the data package DP performed by the blue-tooth transmitter TX through transmitting a returned data package RP1 or RP2 to the blue-tooth transmitter TX. For instance, at least one of the blue-tooth receivers RX1 and RX2 may change a music track being broadcasted through the corresponding returned data package RP1 or RP2. Alternatively, at least one of the blue-tooth receivers RX1 and RX2 may stop the broadcasting of the music track through the corresponding returned data package RP1 or RP2.

Based on the above, in the invention, the acknowledge message is recorded in the header field of at least one blue-tooth data package, the blue-tooth receivers transmit the acknowledge message to the blue-tooth transmitter by means of transmitted header field during the receiving timing window corresponding to the transmitting timing window. Thereby, in the blue-tooth broadcasting system, the blue-tooth transmitter can effectively communicate with the blue-tooth receivers and improve the broadcasting quality without affecting broadcasting quality of the data packages.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A broadcasting method for a bluetooth communication system including a bluetooth transmitter and bluetooth receivers configured for wireless communications using the Bluetooth wireless technology standard, the method comprising:
    detecting N bluetooth receivers in a range of the bluetooth transmitter, wherein N is a positive integer, including detecting a first bluetooth receiver and a second bluetooth receiver;
    broadcasting a first media data file by the bluetooth transmitter, including broadcasting a first media file data package included in the first media data file by the bluetooth transmitter during a first transmitting timing window slot; and
    during N receiving timing window slots, receiving by the bluetooth transmitter N returned data packages which are respectively returned by the corresponding bluetooth receivers, including:
        receiving a first returned data package from the first bluetooth receiver in a first receiving window slot immediately following the first transmitting timing window slot; and
        receiving a second returned data package from the second bluetooth receiver in a second receiving window slot immediately following the first receiving window slot;
        wherein at least one of the N returned data packages includes an acknowledge message which is recorded in a header field of the corresponding returned data package, wherein each acknowledge message comprises an operational request by a respective bluetooth receiver;
    performing a broadcasting adjustment, by a system associated with the bluetooth transmitter, in response to a particular operational request in a particular acknowledge message received by the bluetooth transmitter, wherein performing the broadcasting adjustment includes at least one of stopping the broadcasting by the bluetooth transmitter of the first media data file or starting a broadcasting by the bluetooth transmitter of a second media data file different than the first media data file; and
    based on the broadcasting adjustment, either (a) not transmitting any media file data package or (b) transmitting at least one second media file data package of the second media data file by the bluetooth transmitter during at least one transmitting timing window slot subsequent to the first transmitting window slot.

2. The broadcasting method according to claim 1, wherein the header field comprises an address field, a category or type field, a flow field, a reply field, a sequentially numbering field and a header error control field.

3. The broadcasting method according to claim 2, wherein the acknowledge message is recorded in the address field, the category or type flow field, the flow field and the reply field.

4. The broadcasting method of claim 1, further comprising receiving a communication from at least one receiver, the communication to indicate a receiving state instead of a returned data package.

5. The broadcasting method of claim 1, further comprising receiving a returned data package, the returned data package to indicate that the first media file data package was a broadcast data package.

6. The broadcasting method according to claim 1, wherein broadcasting the first media data file by the bluetooth transmitter comprises streaming a first media data stream by the bluetooth transmitter.

7. The broadcasting method according to claim 1, wherein the first media data file comprises a first music track, and the second media data file comprises a second music track.

8. A bluetooth communication system for wireless communications using the Bluetooth wireless technology standard, comprising:
    an electronic system having a bluetooth transmitter configured for wireless communications using the Bluetooth wireless technology standard; and
    one or more bluetooth receivers configured for wireless communications using the Bluetooth wireless technology standard,
    wherein:
        the bluetooth transmitter is configured to broadcast a first media data file, including broadcasting a first media file data package included in the first media data file during a first transmitting timing window slot to transmit the first media file data package to the one or more bluetooth receivers;
        the one or more bluetooth receivers are respectively configured to return one or more returned data packages to the bluetooth transmitter;
        at least one of the returned data packages includes an acknowledge message which is recorded in a header field of the corresponding returned data package; and
        the bluetooth transmitter is further configured to:
            receive a first returned data package from a first bluetooth receiver in a first receiving window slot following the first transmitting timing window slot, wherein the acknowledge message recorded in the header field of the first returned data package comprises an operational request of the first bluetooth receiver; and
        the electronic system is configured to perform a broadcasting adjustment in response to the operational request in the acknowledge message received by the bluetooth transmitter from the first bluetooth receiver, wherein performing the broadcasting adjustment includes at least one of (a) stopping the broadcasting by the bluetooth transmitter of the first media data file or (b) starting a broadcasting by the bluetooth transmitter of second media file data packages of a second media data file different than the first media data file.

9. The bluetooth communication system according to claim 8, wherein the header field comprises an address field, a category or type field, a flow field, a reply field, a sequentially numbering field and a header error control field.

10. The bluetooth communication system according to claim 9, wherein the acknowledge message is recorded in the address field, the category or type flow field, the flow field and the reply field.

11. The bluetooth communication system according to claim 8, wherein the bluetooth transmitter is further configured to receive a communication from at least one receiver, the communication to indicate a receiving state instead of a returned data package.

12. The bluetooth communication system according to claim 8, wherein the bluetooth transmitter is further configured to receive a returned data package, the returned data package to indicate that the first media file data package was a broadcast data package.

13. The bluetooth communication system according to claim 8, wherein the bluetooth transmitter configured to broadcast the first media data file comprises the bluetooth transmitter configured to stream a first media data stream.

14. The bluetooth communication system according to claim 8, wherein the first media data file comprises a first music track, and the second media data file comprises a second music track.

15. At least one non-transitory medium, the medium comprising instructions, the instructions, when loaded and executed by a processor, cause the processor to:
  control a transmitter to broadcast a first media data stream by the bluetooth transmitter according to the Bluetooth wireless technology standard, including broadcasting a first media data package of the first media data stream during a transmitting timing window slot to transmit the first media data package to one or more bluetooth receivers configured for wireless communications using the Bluetooth wireless technology standard;
  receive one or more returned data packages from the one or more bluetooth receivers, wherein at least one of the returned data packages includes an acknowledge message which is recorded in a header field of the corresponding returned data package;
  receive a first returned data package from a first bluetooth receiver in a first receiving window slot following the transmitting timing window slot, wherein the acknowledge message recorded in the header field of the first returned data package comprises an operational request for performance of a broadcasting adjustment by an electronic system associated with the bluetooth transmitter, wherein performance the broadcasting adjustment includes at least one of (a) stopping the broadcasting by the bluetooth transmitter of the first media data stream or (b) starting a broadcasting by the bluetooth transmitter of a second media data stream different than the first media data stream; and
  in response to receiving the first returned data package including the acknowledge message comprising the operational request for performance of the broadcasting adjustment, control the bluetooth transmitter to at least one of (a) stop the broadcasting of the first media data stream or (b) starting broadcasting of the second media data stream.

16. The medium according to claim 15, wherein the header field comprises an address field, a category or type field, a flow field, a reply field, a sequentially numbering field and a header error control field.

17. The medium according to claim 16, wherein the acknowledge message is recorded in the address field, the category or type flow field, the flow field and the reply field.

18. The medium according to claim 15, further comprising instructions for causing the processor to receive a communication from at least one receiver, the communication to indicate a receiving state instead of a returned data package.

19. The medium according to claim 15, further comprising instructions for causing the processor to receive a returned data package, the returned data package to indicate that the first media data package was a broadcast data package.

20. The medium according to claim 15, wherein the first media data stream comprises at least a portion of a first music track, and the second media data stream comprises at least a portion of a second music track.

* * * * *